United States Patent
Hassaan et al.

(10) Patent No.: US 11,704,946 B2
(45) Date of Patent: Jul. 18, 2023

(54) BOUNDED-ERROR ESTIMATOR DESIGN WITH MISSING DATA PATTERNS VIA STATE AUGMENTATION

(71) Applicants: Syed Hassaan, Tempe, AZ (US); Qiang Shen, Tempe, AZ (US); Sze Zheng Yong, Mesa, AZ (US)

(72) Inventors: Syed Hassaan, Tempe, AZ (US); Qiang Shen, Tempe, AZ (US); Sze Zheng Yong, Mesa, AZ (US)

(73) Assignee: ARIZONA BOARD OF REGENTS ON BEHALF OF ARIZONA STATE UNIVERSITY, Scottsdale, AZ (US)

(*) Notice: Subject to any disclaimer, the term of this patent is extended or adjusted under 35 U.S.C. 154(b) by 491 days.

(21) Appl. No.: 16/925,216

(22) Filed: Jul. 9, 2020

(65) Prior Publication Data
US 2021/0012593 A1    Jan. 14, 2021

Related U.S. Application Data

(60) Provisional application No. 62/871,936, filed on Jul. 9, 2019.

(51) Int. Cl.
G07C 5/08    (2006.01)
G06F 16/215    (2019.01)
G07C 5/00    (2006.01)

(52) U.S. Cl.
CPC ......... G07C 5/0816 (2013.01); G06F 16/215 (2019.01); G07C 5/008 (2013.01)

(58) Field of Classification Search
CPC .... G07C 5/0816; G07C 5/008; G07C 5/0808; G06F 16/215
See application file for complete search history.

(56) References Cited

U.S. PATENT DOCUMENTS

| | | |
|---|---|---|
| 2020/0238987 A1 | 7/2020 | Ozay |
| 2020/0298859 A1 | 9/2020 | Ozay |
| 2020/0339123 A1 | 10/2020 | Ozay |
| 2020/0401161 A1 | 12/2020 | Yong et al. |

(Continued)

OTHER PUBLICATIONS

Bertsimas, D. et al. Theory and applications of robust optimization. SIAM Review, 53(3):464-501, 2011.

(Continued)

*Primary Examiner* — Michael V Kerrigan
(74) *Attorney, Agent, or Firm* — Quarles & Brady LLP

(57) ABSTRACT

The present disclosure provides a method in a data processing system that includes at least one processor and at least one memory. The at least one memory includes instructions executed by the at least one processor to implement a bounded-error estimator system. The method includes receiving information about a plurality of vehicle states of a vehicle from at least one sensor, determining that the information is missing data about at least one vehicle state of the plurality of vehicle states, and determining an estimated vehicle state associated with a final vehicle state. Determining the estimated vehicle state includes calculating a plurality of augmented states for each of the vehicle states included in the plurality of vehicle states and calculating the estimated vehicle state based on the plurality of augmented states. The estimated vehicle state is provided to a vehicle control system of the vehicle.

21 Claims, 5 Drawing Sheets

(56) References Cited

U.S. PATENT DOCUMENTS

| | | | |
|---|---|---|---|
| 2021/0001868 A1* | 1/2021 | Ahn | ................. B60W 50/0097 |
| 2021/0009167 A1 | 1/2021 | Shen | |

OTHER PUBLICATIONS

Blanchini F. et al. A convex optimization approach to synthesizing bounded complexity filters. IEEE Transactions on Automatic Control, 57(1):216-221, 2012.

Goulart P.J. et al. Output feedback receding horizon control of constrained systems. International Journal of Control, 80(1):8-20, 2007.

Gurobi Optimization Inc Gurobi optimizer reference manual, 2015. URL: http://www.gurobi.com.

Kalman R.E. et al. New results in linear filtering and prediction theory. Journal of Basic Engineering, 83(3):95-108, 1961.

Lofberg J. Yalmip : A toolbox for modeling and optimization in Matlab. In Proceedings of the CACSD Conference, Taiwan, 2004.

Luenberger D.G. Observers for multivariable systems. IEEE Transactions on Automatic Control, 11(2):190-197, 1966.

Mickelin, O. et al. Synthesis of correct-by construction control protocols for hybrid systems using partial state information. In American Control Conference, pp. 2305-2311, 2014.

Milanese M. et al. Optimal estimation theory for dynamic systems with set membership uncertainty: An overview. Automatica, 27(6):997-1009, 1991.

Rutledge, K.J. et al. Optimization-based design of bounded-error estimators robust to missing data. In IFAC Conference on Analysis and Design of Hybrid Systems, pp. 157-162, 2018.

Shamma J.S. et al. Set-valued observers and optimal disturbance rejection. IEEE Transactions on Automatic Control, 44(2):253-264, 1999.

Sinopoli, B. et al. Kalman filtering with intermittent observations. IEEE Transactions on Automatic Control, 49 (9):1453-1464, 2004.

Skaf J. et al. Design of affine controllers via convex optimization. IEEE Transactions on Automatic Control, 55 (11):2476-2487, 2010.

Smith S. et al. Estimation with lossy measurements: Jump estimators for jump systems. IEEE Transactions on Automatic Control, 48(12):1453-1464, 2003.

Wachter A. et al. On the implementation of a primal dual interior point filter line search algorithm for large-scale nonlinear programming. Mathematical Programming, 106(1):25-57, 2006.

* cited by examiner

BOUNDED-ERROR ESTIMATOR DESIGN WITH MISSING DATA PATTERNS VIA STATE AUGMENTATION

CROSS-REFERENCES TO RELATED APPLICATIONS

This application claims priority from U.S. Provisional Application No. 62/871,936 filed Jul. 9, 2019, which is hereby incorporated by reference as if fully set forth herein.

STATEMENT REGARDING FEDERALLY SPONSORED RESEARCH

This invention was made with government support under D18AP00073 awarded by the Defense Advanced Research Projects Agency. The government has certain rights in the invention.

BACKGROUND OF THE INVENTION

1. Field of the Invention

This invention relates to error estimation in vehicles.

2. Description of the Related Art

Vehicle state estimation is of concern for certain vehicle applications such as adaptive cruise control. The vehicle state can be determined based on information from sensors, and can capture at least some of the dynamics of the vehicle and/or another vehicle.

Sensors can be prone to being occluded and generating insufficient measurements, and driving control systems can be prone to packet drops. Insufficient measurements and packet drops can result in missing vehicle states.

Therefore, what is needed is an improved method for bounded error estimation of vehicle states.

SUMMARY OF THE INVENTION

In this disclosure, a bounded-error estimator that achieves equalized recovery for discrete-time time-varying affine systems subject to missing data is presented. By augmenting the system state estimate with a Luenberger-like observer error, the equalized recovery estimator design problem can be formulated as a semi-infinite optimization problem, and leverage tools from robust optimization to solve it. Due to the design freedom introduced by the Luenberger-like observer, the eigenvalues of the augmented system can be placed to desired locations, which results in a more optimal intermediate level in the equalized recovery problem than existing approaches in the literature. Furthermore, as an extension of the proposed equalized recovery estimator, missing data is considered in the estimator design, where a fixed-length language is used to specify the allowable missing data patterns. Simulation examples involving an adaptive cruise control system are given to demonstrate the equalized recovery performance of the proposed estimator.

In one aspect, the present disclosure provides a method in a data processing system including at least one processor and at least one memory, the at least one memory including instructions executed by the at least one processor to implement a bounded-error estimator system. The method includes receiving information about a plurality of vehicle states of a vehicle from at least one sensor, each vehicle state being associated with a time point included in a time horizon, determining that the information is missing data about at least one vehicle state included in the plurality of vehicle states in a first predetermined pattern, the first predetermined pattern including an indication of missing data at a first discrete time point, determining an estimated vehicle state associated with a final vehicle state included in the plurality of vehicle states, the determining the estimated vehicle state including calculating a plurality of augmented states for each of the vehicle states included in the plurality of vehicle states using an estimator associated with a language including a second predetermined pattern, the second predetermined pattern including an indication of missing data at the first discrete time point and a second discrete time point, and calculating the estimated vehicle state based on the plurality of augmented states; and providing the estimated vehicle state to a vehicle control system of the vehicle.

In another aspect, the present disclosure provides a driving control system for a vehicle having at least one sensor, the driving control system including at least one sensor coupled to a vehicle, and a controller in electrical communication with the at least one sensor. The controller is configured to execute a bounded-error estimator system program stored in the controller to receive information about a plurality of vehicle states of a vehicle from at least one sensor, each vehicle state being associated with a time point included in a time horizon, determine that the information is missing data about at least one vehicle state included in the plurality of vehicle states in a first predetermined pattern, the first predetermined pattern including an indication of missing data at a first discrete time point, determine an estimated vehicle state associated with a final vehicle state included in the plurality of vehicle states, the determining the estimated vehicle state including calculating a plurality of augmented states for each of the vehicle states included in the plurality of vehicle states using an estimator associated with a language including a second predetermined pattern, the second predetermined pattern including an indication of missing data at the first discrete time point and a second discrete time point, and calculating the estimated vehicle state based on the plurality of augmented states, and providing the estimated vehicle state to a vehicle control system of the vehicle.

In yet another aspect, the present disclosure provides a method in a data processing system including at least one processor and at least one memory, the at least one memory including instructions executed by the at least one processor to implement a bounded-error estimator system. The method includes receiving information about a plurality of vehicle states of a vehicle from at least one sensor, each vehicle state being associated with a time point included in a time horizon, determining that the information is missing data about at least one vehicle state included in the plurality of vehicle states in a first predetermined pattern, the first predetermined pattern including an indication of missing data at a first discrete time point, determining an estimated vehicle state associated with a final vehicle state included in the plurality of vehicle states, the determining the estimated vehicle state including calculating a plurality of augmented states for each of the vehicle states included in the plurality of vehicle states using an estimator associated with a language including a second predetermined pattern, the second predetermined pattern including an indication of missing data at the first discrete time point and a second discrete time point, and calculating the estimated vehicle state based on the plurality of augmented states, and causing a vehicle control system of the vehicle to perform a vehicle maneuver based on the estimated vehicle state.

These and other features, aspects, and advantages of the present invention will become better understood upon consideration of the following detailed description, drawings and appended claims.

DETAILED DESCRIPTION OF THE INVENTION

I. Introduction

Figure 1A:
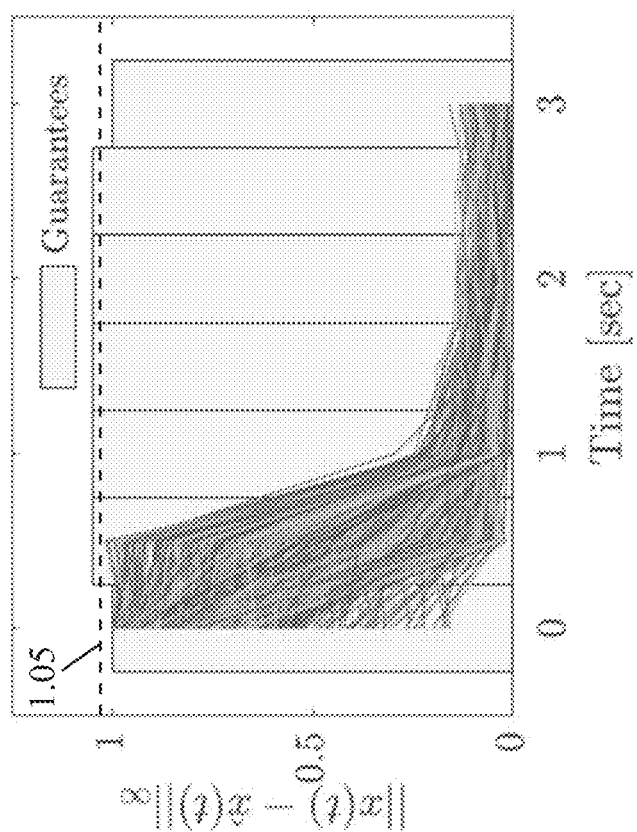
FIG. 1A shows estimation errors with no missing data for 500 runs for a proposed observer using an example method of the present disclosure.

With the rapid advancement in technology, systems are becoming more complex with passing years. Since there are certain crucial system states that cannot be directly measured/observed through system outputs, state estimators, also known as state observers, are designed to tackle this problem. A great deal of current state estimators heavily depends on the accuracy of the sensor measurement. However, as systems such as autonomous vehicles, power grids, smart buildings, etc., become integrated and distributed, significant missing data or communication delays across the sensor networks may be inevitable and these issues need to be addressed when designing estimators. Otherwise, these data losses may deteriorate the estimator performance and cause the resulting closed-loop system to be unstable.

Literature review: Over the years, many different estimation techniques such as the Kalman filter [Ref. 1] and Luenberger observer [Ref. 2] along with their variations and extensions have been introduced. In addition to these asymptotic estimation approaches, set-valued observers [Ref. 3] and $\ell_\infty$ filters [Ref. 4], which can construct a set of compatible state values based on measured outputs, have also received considerable attention in the context of fault detection and estimation, attack identification, resilient control, etc. Taking the issues of missing or intermittent data due to sensor failures or package drops into account, several approaches for estimator design in the presence of missing data are also proposed. In [Ref. 5], by modeling the arrival of the sensor data observation as a random process, a Kalman filter with missing and intermittent observations was presented. In [Ref. 6], a random missing data process described by Markov chains is assumed, and a jump linear estimator is proposed, which is computationally efficient but suboptimal, to deal with missing data. However, since both approaches assume known probability distributions for the discrete state/mode switching process corresponding to missing data, they can only optimize the expected/average estimation performance. On the other hand, instead of assuming that the missing data process is stochastic, Rutledge et al [Ref. 7] modeled the missing data by using a fixed-length language specification that specifies the set of allowable missing data patterns over a fixed time horizon. In contrast to the approaches for probabilistic intermittent observations such as [Ref. 5] and [Ref. 6], estimators using the fixed-length language specification for missing data patterns ensure estimation performance for the worst-case missing data scenario.

Another set of relevant literature pertains to bounded-error estimators. Recently, a new property for bounded estimation error known as equalized performance has been proposed [Ref. 8], which means the estimation error will not increase at all times. In [Ref. 9], a locally superstable observer with equalized performance was introduced to obtain state estimates with bounded errors from partial state observation, which further enables the synthesis of output-feedback control laws for discrete-time piecewise-affine systems subject to linear temporal logic specifications. In [Ref. 7], a finite horizon affine estimator was proposed by leveraging Q-parameterization from [Ref. 10] to achieve equalized recovery, i.e., the estimation error may satisfy a more relaxed error bound for a finite horizon after which it recovers to the desired error bound.

In this disclosure, a bounded-error dynamic estimator based on state augmentation that achieves equalized recovery of the state estimation error for discrete-time affine time-varying systems in the presence of missing data caused by sensor failures or packet drops is presented. First, in the case of no missing data, a Luenberger-like observer is introduced to estimate the state error dynamics, and further augment the state estimate with the Luenberger-like observer error. For this augmented system, it is shown that the equalized recovery estimator design problem can be formulated as a semi-infinite optimization problem. By leveraging tools from robust optimization, the equalized recovery estimator design problem can be recast as a non-convex but sparse optimization problem for which efficient off-the-shelf optimization softwares are available. Then, by expressing missing data patterns as fixed-length language specifications, the proposed estimator can be extended to handle the worst-case missing data scenario (and thus, the estimator also applies for less severe missing data scenarios). Compared to other approaches, with the introduction of a Luenberger-like observer into the proposed equalized recovery estimator, there is more design freedom for potentially obtaining a smaller intermediate estimation error level, as illustrated in the simulation examples. Moreover, the effects of fixing some decision variables of a non-convex formulation to obtain a convex optimization problem and provide some examples where some suitable fixed choices of these variables lead to no loss in optimality are discussed.

II. Problem Formulation

A. Notations

Throughout the disclosure, $\mathbb{R}^n$ is used to represent the n-dimensional Euclidean space, $\mathbb{N}$ for positive integers and $\mathbb{B}^n$ for the n-dimensional binary vector. The symbol $\otimes$ denotes the Kronecker product, $\|\cdot\|$ is used to denote the infinity norm of vectors or matrices. An identity matrix of size s is denoted by $I_s$, a vector of ones of length s is denoted by $\mathbb{1}_s$, while a zero matrix of dimension a-by-b is denoted by $0_{a \times b}$. The inequalities for comparing vectors and matrices are all element-wise.

B. System Dynamics

In this disclosure, discrete-time affine time-varying systems with bounded errors is considered as follows:

$$x_{k+1} = A_k x_k + B_k u_k + W_k w_k + f, \qquad (1)$$

$$y_k = \begin{cases} C_k x_k + V_k v_k, & q_k = 1, \\ \emptyset, & q_k = 0, \end{cases}$$

where $x_k \in \mathbb{R}^n$ is the system state at time k, $\mu_k \in \mathbb{R}^m$ is the input to the system, $w_k \in \mathbb{R}^n$ is the process noise, $y_k \in \mathbb{R}^p$ is the output of the system accessible by sensors and $v_k \in \mathbb{R}^p$ is the measurement noise. The system matrices $A_k$, $B_k$, $C_k$, $W_k$, $V_k$ and f are all known. $q_k \in \{0,1\}$ is the measurement mode which indicates whether the measurement at time k is available or missing. It is assumed that $w_k$ and $v_k$ are bounded with $\|w_k\| \leq \eta_w$ and $\|v_k\| \leq \eta_v$ for every k. Without loss of generality, it is assumed that the initial time is k=0.

Missing Data Language: A missing data model with no assumption that the measurement mode sequence follows a known stochastic process, but that they are restricted to a set of missing data patterns expressed by fixed-length language specifications, e.g., 'every n-th observation is missing' or 'at least m available measurements in the fixed interval' can be used with an estimator. More formally, within a finite time horizon T, the present missing data model is a fixed-length language $\mathcal{L} \subseteq \mathbb{B}^T$ that specifies the set of allowable measurement mode sequences $\{q_k\}_{k=0}^{T-1}$.

C. Equalized Recovery

One focus of this disclosure is to design a bounded-error estimator, where the estimation error is guaranteed to return/recover to the same bound that it started with after a fixed number of time steps, as an extension of the notion of equalized performance. In terms of a time horizon T, the estimation error bound at the end of the horizon is guaranteed to be at most the same as the bound at the start of the horizon. Formally, the equalized recovery problem is considered:

Definition 1 (Equalized Recovery). An estimator is said to achieve an equalized recovery level $\mu_1$ at time 0 with recovery time T and intermediate level $\mu_2 \geq \mu_1$ if for any initial state estimate $\tilde{x}_0$ that satisfies $\|\tilde{x}_0\| \leq \mu_1$, $\|\tilde{x}_k\| \leq \mu_2$ for all $k \in [0,T]$ and $\|\tilde{x}_T\| \leq \mu_1$, where $\hat{x}_k$ is the state estimate at time k and $\tilde{x} \triangleq x_k - \hat{x}_k$ is the estimation error.

D. Problem Statement

One advantage of this disclosure is to design a bounded-error estimator that satisfies equalized recovery, which can be stated as follows:

Problem 1 (Estimator Design). Given the system dynamics in (1), a desired recovery level $\mu_1$, a recovery time T as a time horizon and a missing data model specified by a language $\mathcal{L}$ as well as an initial state estimate $\hat{x}_0$ that satisfies $\|\tilde{x}_0\| \leq \mu_1$, design an optimal bounded-error state estimator with estimate $\hat{x}_k$ and estimation error $\tilde{x}_k = x_k - \hat{x}_k$ for all $k \in [0, T]$ that minimizes the intermediate level $\mu_2$ subject to $\mu_2 \geq \mu_1$, $\|\tilde{x}_k\| \leq \mu_2$, $\forall k \in [0, T]$ and $\|\tilde{x}_T\| \leq \mu_1$.

III. Estimator Design Approach

In order to tackle Problem 1, a finite horizon dynamic estimator with an augmented state $\bar{x}_k \triangleq [\hat{x}_k^T \; s_k^T]^T$ is considered as follows:

$$\hat{x}_{k+1} = A_k \hat{x}_k + B_k u_k - u_{e,k} + f,$$

$$s_{k+1} = A_k s_k + u_{e,k} + L_k(\tilde{y}_k - C_k s_k),$$

$$\hat{y}_k = C_k \hat{x}_k, \qquad (2)$$

where $\hat{x}_k \in \mathbb{R}^n$ is the estimate of the system state $x_k$, $s_k \in \mathbb{R}^n$ is an auxiliary state (that can be interpreted as the Luenberger-like observer error), $\hat{y}_k$ is the estimated output from the estimated state, and $u_{e,k} \in \mathbb{R}^n$ is the following causal output error injection term:

$$u_{e,k} = v_k + \sum_{i=0}^{k} M_{(k,i)}(\tilde{y}_i - C_i s_i), \qquad (3)$$

where $\tilde{y}_k \triangleq y_k - \hat{y}_k = y_k - C_k \hat{x}_k$ while $L_k \in \mathbb{R}^{n \times p}$, $M_{(k,i)} \in \mathbb{R}^{n \times p}$ and $v_k \in \mathbb{R}^n$ are to-be-designed gain matrices at time k. $\hat{x}_0$ is given whereas $s_0$ is a design variable. Unlike other approached, it is not assumed that $(A_k - L_k C_k)$ is stable with the Luenberger-like observer gain $L_k$. The effect of eigenvalues of $(A_k - L_k C_k)$, which can be controlled by $L_k$ will be covered in the discussion in Section IV-C.

First, the estimator design is presented for the perfect case when there is no missing data. Then, those results are extended from the perfect case to the case of missing data patterns that satisfy a given fixed-length language.

A. Perfect Case: No Missing Data

In this case, it is assumed that the observer has access to all the measurement data at any given time, which means that $q_k = 1$ for all $k \in [0, T-1]$. Before proceeding, some additional notations for stacked versions of the various signals (with $e_k \triangleq \tilde{x}_k - s_k$) are defined as follows:

$$\tilde{x} = [\tilde{x}_0^T \ldots \tilde{x}_T^T]^T, \; s = [s_0^T \ldots s_T^T]^T, \; e = [e_0^T \ldots e_T^T]^T,$$

$$u_e = [u_{e,0}^T \ldots u_{e,T-1}^T]^T, \; v = [v_0^T \ldots v_{T-1}^T]^T,$$

$$w = [w_0^T \ldots w_{T-1}^T]^T, \; v = [v_0^T \ldots v_{T-1}^T]^T.$$

In the following theorem, the estimator design can be formulated as a semi-infinite optimization problem:

Theorem 1 (Perfect Measurement Scenario). An optimal finite-horizon affine estimator (2) that solves Problem 1 when there is no measurement data loss is obtained by solving the following optimization problem:

$$\min_{M,v,\mu_2,s_0,L} \mu_2 \qquad (4)$$

subject to $\forall\,(\|w\| \le \eta_w, \|v\| \le \eta_v, \|\tilde{x}_0\| \le \mu_1)$:

$\|\tilde{x}\| \le \mu_2, \|R_T\tilde{x}\| \le \mu_1,$
$\tilde{x} = \Theta w + \Psi v + \Xi \tilde{x}_0 + Ys_0 + Ev,$
where $$R_T = [\,0_{n \times nT}\;\; I_n\,], \qquad (5)$$
$\Theta = (I + E(M + L)C)\Gamma W,$
$\Psi = (E(M + L)(I - C\Gamma L) - \Gamma L)V,$
$\Xi = (I + E(M + L)C)\Phi,$
$Y = A - \Xi,$
with $A, C, E, L, M, W, V,$
$\Gamma$ and $\Phi$ defined in the Appendix.

APPENDIX: MATRIX DEFINITIONS

The matrices given in Theorem 1 are defined as follows:

$$W = \begin{bmatrix} W_0 & 0 & \cdots & 0 \\ 0 & W_1 & \ddots & \vdots \\ \vdots & \ddots & \ddots & 0 \\ 0 & \cdots & 0 & W_{T-1} \end{bmatrix}, V = \begin{bmatrix} V_0 & 0 & \cdots & 0 \\ 0 & V_1 & \ddots & \vdots \\ \vdots & \ddots & \ddots & 0 \\ 0 & \cdots & 0 & V_{T-1} \end{bmatrix},$$

$$C = \begin{bmatrix} C_0 & 0 & \cdots & 0 & 0 \\ 0 & C_1 & \ddots & \vdots & \vdots \\ \vdots & \ddots & \ddots & 0 & 0 \\ 0 & \cdots & 0 & C_{T-1} & 0 \end{bmatrix}, L = \begin{bmatrix} L_0 & 0 & \cdots & 0 \\ 0 & L_1 & \ddots & \vdots \\ \vdots & \ddots & \ddots & 0 \\ 0 & \cdots & 0 & L_{T-1} \end{bmatrix},$$

$$M = \begin{bmatrix} M_{(0,0)} & 0 & \cdots & 0 \\ M_{(1,0)} & M_{(1,1)} & \ddots & \vdots \\ \vdots & \vdots & \ddots & 0 \\ M_{(T-1,0)} & M_{(T-1,1)} & \cdots & M_{(T-1,T-1)} \end{bmatrix},$$

$$A = \begin{bmatrix} I_n \\ A_0^1 \\ \vdots \\ A_0^{T-1} \\ A_0^T \end{bmatrix}, \Phi = \begin{bmatrix} I_n \\ \Phi_0^1 \\ \vdots \\ \Phi_0^{T-1} \\ \Phi_0^T \end{bmatrix},$$

$$E = \begin{bmatrix} 0 & 0 & 0 & \cdots & 0 \\ A_1^1 & 0 & 0 & \cdots & 0 \\ A_1^2 & A_2^2 & 0 & \cdots & \vdots \\ \vdots & \vdots & \ddots & \ddots & 0 \\ \vdots & \vdots & & \ddots & 0 \\ A_1^T & A_2^T & \cdots & \cdots & A_T^T \end{bmatrix}, \Gamma = \begin{bmatrix} 0 & 0 & 0 & \cdots & 0 \\ \Phi_1^1 & 0 & 0 & \cdots & 0 \\ \Phi_1^2 & \Phi_2^2 & 0 & \cdots & \vdots \\ \vdots & \vdots & \ddots & \ddots & 0 \\ \vdots & \vdots & & \ddots & 0 \\ \Phi_1^T & \Phi_2^T & \cdots & \cdots & \Phi_T^T \end{bmatrix},$$

where $A_i^k = A_{k-1}A_{k-2} \ldots A_i$, $\Phi_i^k = \Phi_{k-2} \ldots \Phi_i$ and $\Phi_k = A_k - L_k C_k$.

Proof. With the estimator defined in (2) for the system in (1), the error dynamics of the system will be as follows:

$$\tilde{x}_{k+1} = x_{k+1} - \hat{x}_{k+1}, \qquad (6)$$
$$= A_k \tilde{x}_k + u_{e,k} + W_k w_k,$$

$$\tilde{y}_k = C_k \tilde{x}_k + V_k v_k,$$

where $\tilde{x}_k$ and $\tilde{y}_k$ are state estimation error and output error respectively. These error dynamics in (6) can be viewed as another dynamic system with the state now being the error $\tilde{x}_k$ and the control input to the system being $u_{e,k}$.

For this new system, [for background see Ref. 11], a Luenberger-like observer is considered for the estimator design in the following form:

$$s_{k+1} = A_k s_k + u_{e,k} + L_k(\tilde{y}_k - C_k s_k), \qquad (7)$$

where $s_k$ is the Luenberger-like estimate of error $\tilde{x}_k$ and $L_k$ is the Luenberger-like observer gain at time k.

Considering the error system defined in (6) as well as its observer defined in (7), the following estimation error of the error system is as follows:

$$e_k = \tilde{x}_k - s_k. \qquad (8)$$

Since the design is incorporating a finite time horizon T, the augmented system states, measurements, and errors can be stacked, and (6), (7), (8), and (3) can be rewritten with the stacked matrices, to obtain the following affine equations:

$$s = As_0 + Eu_e + EL(Ce + Vv),$$

$$e = \Phi e_0 - \Gamma Lv + \Gamma Ww,$$

$$u_e = M(Ce + Vv) + v,$$

$$e = \tilde{x} - s. \qquad (9)$$

Here, the terms $s_0$ and $e_0$ are the initial values of s and e, respectively.

Then, the estimation error $\tilde{x}$ is:

$$\tilde{x} = e + s \qquad (10)$$
$$= \Theta w + \Psi v + \Xi \tilde{x}_0 + Ys_0 + Ev$$

and the $\tilde{x}_T$ value at the end of the time horizon is given by $$\tilde{x}_T = R_T \tilde{x}.$$

Finally, based on the requirements for equalized recovery in Definition 1, $\|\tilde{x}_k\| \le \mu_2$ for all $k \in [0,T]$ and $\|\tilde{x}_T\| \le \mu_1$ for the worst-case noise w, v and uncertainty in the initial state estimate $\tilde{x}_0$.

B. Robustification

In the optimization problem defined in Theorem 1, for all constraints involving w, v and $\tilde{x}_0$ exist that are semi-infinite, which makes them not readily solvable. The problem can be robustified such that only have finitely many constraints exist. The robustified problem is given below:

Proposition 1 (Robust Problem for Estimation). After robustification, the problem (1) takes the following form:

$$\min_{\substack{M,v,\mu_2,s_0,\\L,\Pi_1,\Pi_2}} \mu_2 \qquad (11)$$

subject to $\Pi_1 \ge 0, \Pi_2 \ge 0,$

-continued $$\begin{bmatrix} \Pi_1 \\ \Pi_2 \end{bmatrix} \begin{bmatrix} \eta_w \mathbb{1} \\ \eta_v \mathbb{1} \\ \mu_1 \mathbb{1} \end{bmatrix} \leq \begin{bmatrix} \mu_2 \mathbb{1} \\ \mu_1 \mathbb{1} \end{bmatrix} - \begin{bmatrix} I & 0 \\ -I & 0 \\ 0 & I \\ 0 & -I \end{bmatrix} \begin{bmatrix} Ev + \Upsilon s_0 \\ R_T(Ev + \Upsilon s_0) \end{bmatrix},$$

$$\begin{bmatrix} \Pi_1 \\ \Pi_2 \end{bmatrix} \begin{bmatrix} I & 0 & 0 \\ -I & 0 & 0 \\ 0 & I & 0 \\ 0 & -I & 0 \\ 0 & 0 & I \\ 0 & 0 & -I \end{bmatrix} = \begin{bmatrix} I & 0 \\ -I & 0 \\ 0 & I \\ 0 & -I \end{bmatrix} \begin{bmatrix} G \\ R_T G \end{bmatrix},$$

where $G \triangleq [\Theta \Psi \Xi]$ with $\Theta$, $\Psi$, $\Xi$ defined in (5), while $\Pi_1$ and $\Pi_2$ are dual matrix variables of appropriate dimensions.

Proof. Since '$\forall(\|w\| \leq \eta_w, \|v\| \leq \eta_v, \|\tilde{x}_0\| \leq \mu_1)$ such that $\|\tilde{x}\| \leq \mu_2$ and $\|R_T \tilde{x}\| \leq \mu_1$ hold' is equivalent to the conjunction of '$\forall(\|w\| \leq \eta v_w, \|v\| \leq \eta_v, \|\tilde{x}_0\| \leq \mu_1)$ such that $\|\tilde{x}\| \leq \mu_2$ holds' and '$\forall(\|w\| \leq \eta_w, \|v\| \leq \eta_v, \|\tilde{x}_0\| \leq \mu_1)$ such that $\|R_T \tilde{x}\| \leq \mu_1$ holds,' only the robustification of the former will be derived herein. The latter can be derived similarly.

The constraint '$\forall(\|w\| \leq \mu_w, \|v\| \leq \eta_v, \|\tilde{x}_0\| \leq \mu_1)$ such that $\|\tilde{x}\| \leq \mu_2$ holds' is equivalent to $$\max_{\substack{\|w\| \leq \eta_w, \|v\| \leq \eta_v, \\ \|\tilde{x}_0\| \leq \mu_1}} \begin{bmatrix} I \\ -I \end{bmatrix} (\Theta w + \Psi v + \Xi x_0 + \Upsilon \tilde{x}_0 + \Upsilon s_0 + Ev) \leq \mu_2 \mathbb{1}.$$

Since the variables in the preceding maximization appear linearly, duality theory can be applied with $\Pi_1$ being the dual matrix variable, and there will be no duality gap, i.e., the dualization or conversion is exact.

Remark 1. The optimization problem in Proposition 1 has bilinear constraints because of $\Psi$ and the product of $\Upsilon$ and $s_0$. However, the problem is relatively sparse, hence off-the-shelf nonlinear optimization solvers can return optimal solutions very quickly, as is demonstrated in the simulation example. On the other hand, L and $s_0$ are fixed, the problem becomes a linear programming (LP) problem. Guidelines are presented below on how to choose L and $s_0$ without any loss of optimality.

C. Missing Data Case

To deal with measurement data loss, Theorem 1 is further extended to the missing data scenario, where the missing data patterns are described by a fixed-length language, $\mathcal{L} \subseteq \mathbb{B}^T$, which is assumed to be known. For instance, the language $\mathcal{L} = \{\sigma \in \mathbb{B}^T \sigma \text{ has at least m 1's in T time steps}\}$ defines the missing data pattern of 'there exists at least m available data over a time horizon T.' A specific language $\mathcal{L}$ may contain multiple words, i.e., with cardinality $|\mathcal{L}| \geq 1$, but the estimator design approach in Theorem 1 only handles the case with $|\mathcal{L}|=1$. To cope with the case where $|\mathcal{L}|>1$, a less than or equal operator ($\preceq$) can be used for two words $\sigma_1 \in \mathcal{L}$ and $\sigma_2 \in \mathcal{L}$ in a language $\mathcal{L} \subseteq \mathbb{R}^T$: $\sigma_1 \preceq \sigma_2 \Leftrightarrow \in [1, T]$: $\sigma_1[i]=0 \Rightarrow \sigma_2[i]=0$. Thus, according to the $\preceq$ operator, we can obtain a worst-case language $\mathcal{L}^* \triangleq \{\sigma^* \in \mathbb{B}^T\}$, where $\sigma^*$ is the least upper bound of the set $\mathcal{L}$ that is computed by implementing a bitwise logic AND operation among all words in $\mathcal{L}$. As a result, only the missing data pattern where the observations are always available to the designer needs to be considered.

Theorem 2 (Estimator Design with Missing Data). A finite horizon affine estimator, which can solve Problem 1 when there is measurement data loss defined by a fixed-length language $\mathcal{L}^*=\{\sigma^*\}$ with $|\mathcal{L}|=1$, will exist if the following problem has a feasible solution:

$$\min_{M,v,\mu_2,s_0,L} \mu_2 \quad (12)$$

subject to $\forall (\|w\| \leq \eta_w, \|v\| \leq \eta_v, \|\tilde{x}_0\| \leq \mu_1$, $i \in \{i: \sigma^*(i) = 0\})$:

$\|\tilde{x}\| \leq \mu_2, \|R_T \tilde{x}\| \leq \mu_1,$ $\tilde{x} = \Theta w + \Psi v + \Xi \tilde{x}_0 + \Upsilon s_0 + Ev,$ $M\Lambda_i = 0, L\Lambda_i = 0$ and $v^T \Lambda_i = 0,$ where $\Lambda_i = b_i \otimes I_p$ with $b_i \in \mathbb{R}^T$ being the $i$-th basis vector in $\mathbb{R}^T$, while $R_T, \Theta, \Psi,$ $\Xi$ and $\Upsilon$ are defined in Theorem 1.

Proof. The proof is almost the same as the proof to Theorem 1 besides additional constraints introduced to set the i-th column of matrices M and L, and the i-th row of vector v to zero, $\forall i \in \{i: \sigma^*(i)=0\}$ for when the data is missing.

The robustification of the formulation in Theorem 2 can be carried out in the exact same manner as in Proposition 1. In fact, the resulting optimization problem is the same as in Proposition 1 with the addition of $M\Lambda_i=0$ and $L\Lambda_i=0$ for all $i \in \{i: \sigma^*(i)=0\}$ as constraints. Moreover, since the worst-case language $\mathcal{L}^*$ is considered in Theorem 2, the constructed estimator also applies to other fixed-length languages whose worst-case is $\mathcal{L}^*$.

D. Implementation of the Estimator

The proposed equalized recovery estimator can be utilized in several different scenarios. First, if the missing data pattern periodically repeats itself with a period of T steps, then the time can be reset back to $k_0$ every T steps and use the same estimator with the same gain matrices L, M and v, since the proposed estimator enforces that the estimation error bound at the end of the horizon is no more than the bound at the start of the horizon.

On the other hand, when there is no missing data for certain time intervals, an equalized performance estimator can be used, which is essentially the equalized recovery estimator with T=1. In addition, the equalized performance estimator can be used to guarantee the bounded estimation error level until a missing data is observed, after which a process can immediately switch to an equalized recovery estimator (with a language where the first data is missing). Then, when the estimation error returns/recovers to the previous level, the equalized performance estimator can be used again until the next time a missing data is detected.

IV. Example And Discussion

In this section, using an example of a discrete-time affine system, capabilities of the present equalized recovery estimator in handling missing data patterns described by a fixed-length language $\mathcal{L}$ are described. In particular, simulation results are compared with those from an existing equalized recovery estimator to show the advantages of the present approach. Moreover, the influence of choosing different Luenberger-like observer gain L and initial state $s_0$ on the estimation error guarantees is explored.

A. Adaptive Cruise Control Example

To validate the capability of achieving equalized recovery of the proposed estimator, an adaptive cruise control (ACC) system in is considered, which is a discrete-time affine system model (1) with time-invariant matrices given by:

$$A = \begin{bmatrix} 0.9964 & 0 & 0 \\ -0.4991 & 1 & 0.5 \\ 0 & 0 & 1 \end{bmatrix}, B = \begin{bmatrix} 0.3643 \times 10^{-3} \\ -0.0911 \times 10^{-3} \\ 0 \end{bmatrix},$$

$$C = \begin{bmatrix} 1 & 0 & 0 \\ 0 & 1 & 0 \end{bmatrix}, f = \begin{bmatrix} -0.0028 \\ 0.0007 \\ 0 \end{bmatrix}, W = \begin{bmatrix} 0 \\ 0.125 \\ 0.5 \end{bmatrix}, V = I_p.$$

Throughout the simulation, the value of the equalized recovery level is chosen as $\mu_1=1$ and the time step for recovering the estimation error is specified as T=6, which corresponds to a time horizon of 3 seconds.

For the simulation, YALMIP was used in the MATLAB environment with various solvers to solve the problem. For the nonlinear optimization problem in Proposition 1 (when $L_k$ and $s_0$ are decision variables), IPOPT, a nonlinear programming solver, was used as the solver of choice because it exploits the sparsity of the matrices involved to quickly solve the problem. When the values of L and $s_0$ are fixed, the equalized estimator design problem becomes an LP problem, and in this case, the Gurobi solver was used to illustrate the influence of solver choices on the solutions.

B. Results

Figure 1B:
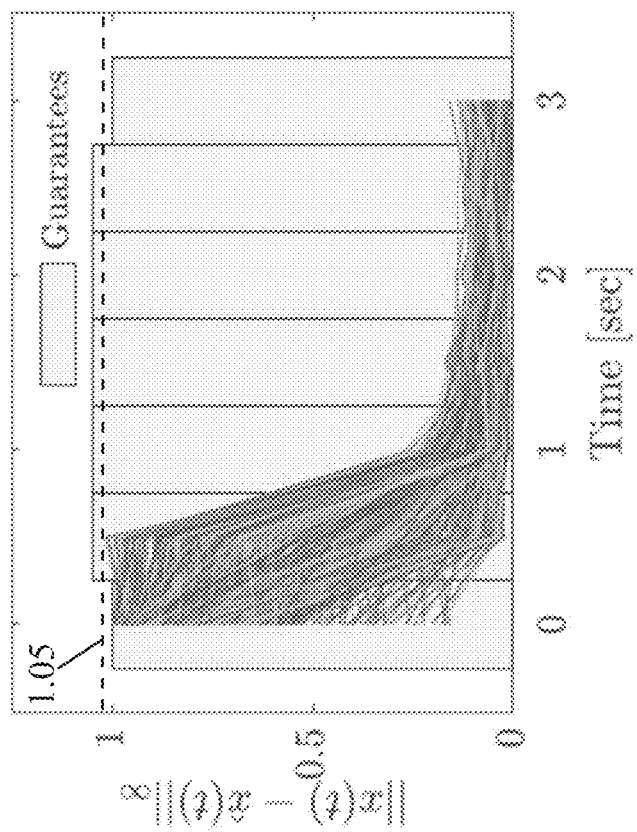
FIG. 1B shows estimation errors with no missing data for 500 runs for an observer using the method of Ref. 7.
Figure 2B:
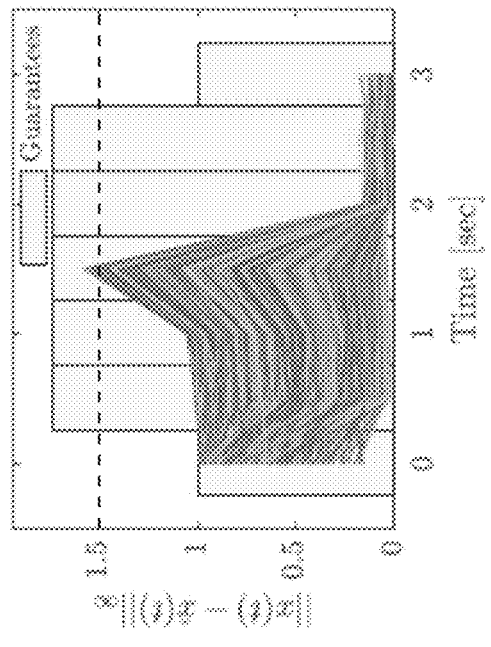
FIG. 2B shows estimation errors with missing data and recovery time T=6 for 500 runs for an observer using the method of Ref. 7 using "worst-case" language with missing data at k=2.
Figure 2D:
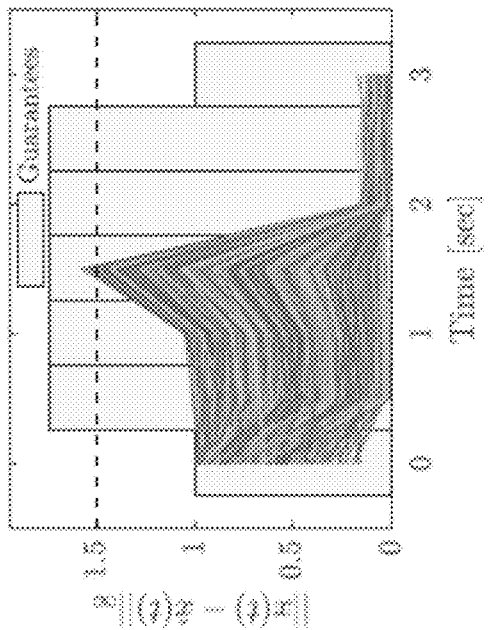
FIG. 2D shows estimation errors with missing data and recovery time T=6 for 500 runs for an observer using the method of Ref. 7 using "worst-case" language with missing data at k=3.
Figure 2A:
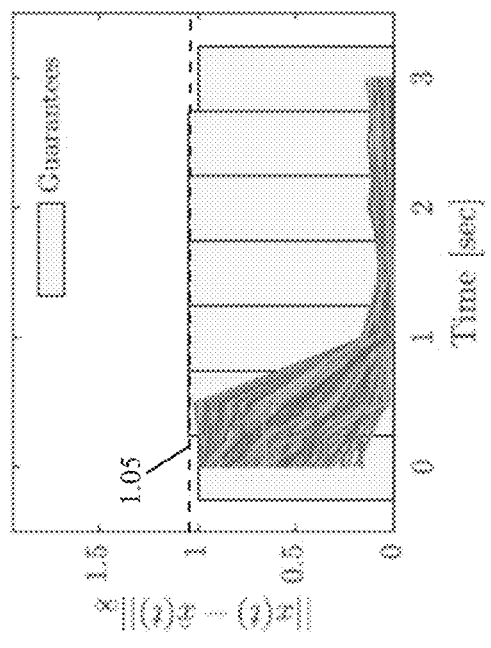
FIG. 2A shows estimation errors with missing data and recovery time T=6 for 500 runs for a proposed observer using an example method of the present disclosure using "worst-case" language with missing data at k=2.
Figure 2C:
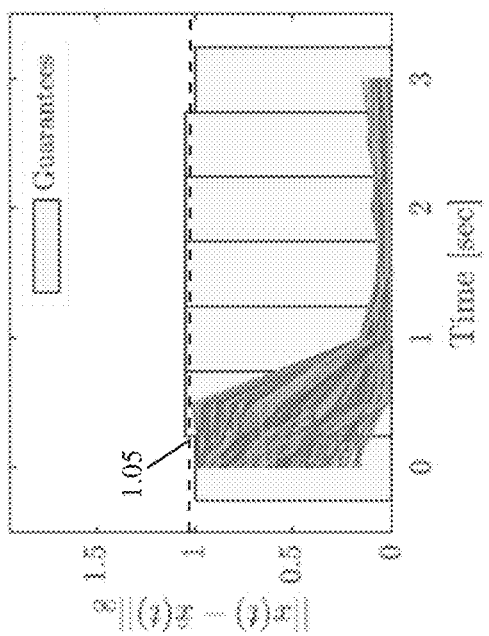
FIG. 2C shows estimation errors with missing data and recovery time T=6 for 500 runs for a proposed observer using an example method of the present disclosure using "worst-case" language with missing data at k=3.

First, the perfect scenario with no missing data is considered. In this case, the fixed-length language is just $\mathcal{L}=\{1_T\}$. When using the optimization formulation in Theorem 1, the optimal value of the intermediate level of $\mu_2=1.05$ is obtained, which is the same as the level obtained by the estimator in [Ref. 7]. It can be observed from FIGS. 1A and 1B that the results of both approaches (when using IPOPT) are very close to each other. For example, as shown in both FIGS. 1A and 1B, all values of estimation error $\tilde{x}$ are less than or equal to the intermediate level, $\mu_2=1.05$. Moreover, the optimal Luenberger-like gain is L=[1.31, -1.6; 0.05, 0.51; 0.81-1.06], which results in eigenvalues of (A-LC) to be $\{1.04, 0.07\pm0.48j\}$, which shows that (A-LC) needs not be stable. Moreover, the obtained $s_0=10^{-7}[-0.19; -0.24; 0.15]$ is evaluated by the solver to be approximately zero.

Next, missing data patterns that satisfy the language $\mathcal{L}=\{101111, 110111\}$ are considered. It is clear from its definition in Section III-C that the worst-case language is $\mathcal{L}^*=\{100111\}$. Solving the optimization problem in Theorem 2 with this worst-case language, the same optimal value of $\mu_2=1.05$ with L=[0.76, 0.04; 0.11, 1.97; 0.8, 1.97] is obtained, which makes the eigenvalue locations to be $\lambda(A-LC)=\{-0.09, 0.18\pm0.07j\}$ and $s_0=10^{-7}[0.08; 0.1; -0.1]$ that is also close to zero. As shown in FIGS. 2A-2D, comparing the proposed approach a previous approach under the same missing data scenario, using the present approach, the optimal intermediate level $\mu_2$ remains the same as in the no missing data scenario, while the approach in [Ref 7] computes a larger $\mu_2$. For example, as shown in both FIGS. 2A and 2C, all values of estimation error $\tilde{x}$ are less than or equal to the intermediate level, $\mu_2=1.05$, while in FIGS. 2B and 2D, some values of the estimation error exceed 1.05. This example suggests that the proposed state augmentation approach has additional 'degrees of freedom' (with more states and gain matrices) when compared with the approach in [Ref 7], which enables the present approach to obtain a smaller $\mu_2$.

C. Discussion

Next, the effects of varying the eigenvalues of the Luenberger-like observer state matrix A-LC by fixing Luenberger-like gain L and value of $s_0$ (such that the optimization problem in Proposition 1 becomes a linear programming (LP) problem) on the overall estimator guarantee in terms of the minimum value of $\mu_2$ are discussed.

First, to see the effect of $s_0$ on the estimator guarantees, the optimal intermediate level $\mu_2$ is computed with respect to different $s_0$. It was observed that varying $s_0$ does not affect the optimal value of $\mu_2$ for any chosen L. In addition, although varying $s_0$ results in different optimal matrices M and v for the causal output error injection term $u_e$, it does not affect the resulting true estimation error $\tilde{x}=x-\hat{x}$. Thus, without any loss of optimality, $s_0$ can be set as a constant (e.g., $s_0=0$) instead of including it as a decision variable in Proposition 1.

Figure 3B:
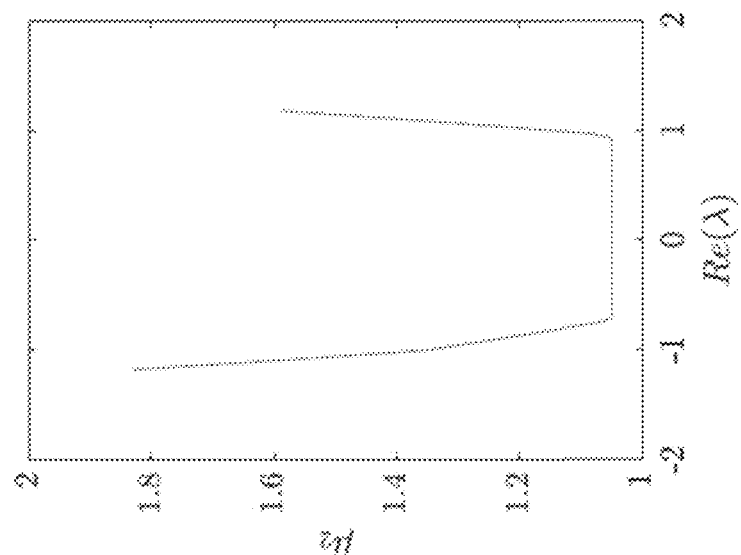
FIG. 3B shows a projection of FIG. 3A with Im($\lambda$)=0.
Figure 3A:
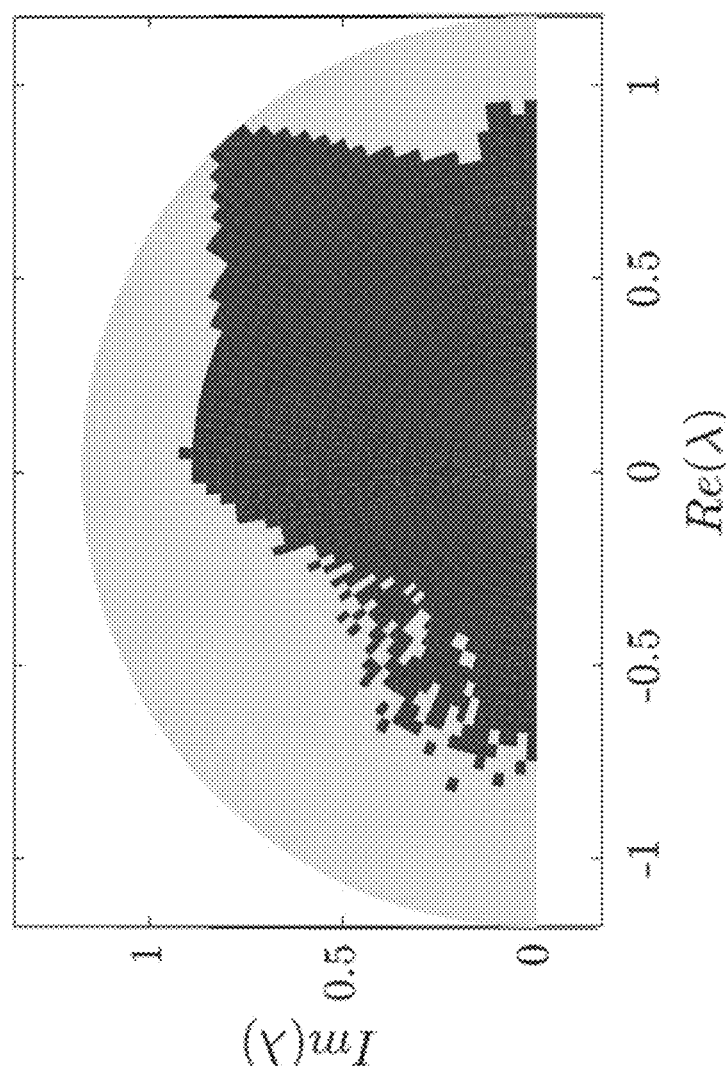
FIG. 3A shows a heat map of $\mu_2$ values with varying complex eigenvalue locations (blue [darker gray]: $\mu_2$=1:05, yellow [lighter gray]: $\mu_2$>1:05).

Then, fixing $s_0=0$, the effect of varying the Luenberger-like gain L is investigated, and hence, the eigenvalues of the Luenberger observer error (A-LC) (as an augmented new system state) on the optimal intermediate level $\mu_2$. As before, the worst-case language $\mathcal{L}^*=\{100111\}$ is considered. In particular, L is varied such that (A-LC) has one eigenvalue at 0 and a pair of complex conjugate eigenvalues at r(cos($\theta$)$\pm$j sin($\theta$)) with r$\in$[0,1.5] and $\theta\in$[0,$\pi$], and compute the optimal intermediate level $\mu_2$ for each L. The trend obtained from solving the problem is shown in FIGS. 3A and 3B, from which it is clear that the value of $\mu_2$ does not change in the blue area in FIG. 3A. Moreover, the same trend is observed for its projection onto the real axis in FIG. 3B, where $\mu_2$ does not change for real eigenvalues varying from -0.7143 to 0.9286. This implies that the Luenberger-like gain L can be fixed through eigenvalue placement such that the spectral radius of (A-LC) is small enough to obtain the optimal estimator guarantee instead of optimizing it, which simplifies the optimization problem in Proposition 1 to an LP problem.

Finally, it is also interesting to note that the use of different solvers can result in different actual estimation error $\tilde{x}$, even though the optimal intermediate level $\mu_2$ remains the same, as one would expect. Specifically, when the values of L and $s_0$ are fixed, an LP problem is presented, and both the IPOPT and Gurobi solvers can be applied. The simulation results (not depicted for brevity) show that IPOPT yields a lower actual estimation error $\tilde{x}$ than Gurobi and the optimal values of v and M for the two solvers are different, although their optimal intermediate levels $\mu_2$ are identical. This observation can be attributed to the fact that Problem 1 may have multiple minimizers that result in the same optimal $\mu_2$ (i.e, the solution is not unique), thus different solvers may select a different optimal solution that leads to different actual estimation errors $\tilde{x}_2$.

V. Conclusion

This disclosure considered the equalized recovery estimator design problem for discrete-time time-varying affine systems in the presence of missing data, where the missing data model is expressed by a fixed-length language that consists of a set of missing data patterns. First, for the case with no missing data, the system state estimate is augmented with a Luenberger-like observer error, and using this augmented system, the estimator design problem can be formulated as a nonconvex but sparse optimization problem. Then, an extension is presented when there is missing data, where a robust solution is provided for the worst-case language. Future work will explore the handling of communication delays and missing data when designing equalized recovery estimators.

EXAMPLE

This Example is provided in order to demonstrate and further illustrate certain embodiments and aspects of the present invention and is not to be construed as limiting the scope of the invention.

Figure 4:
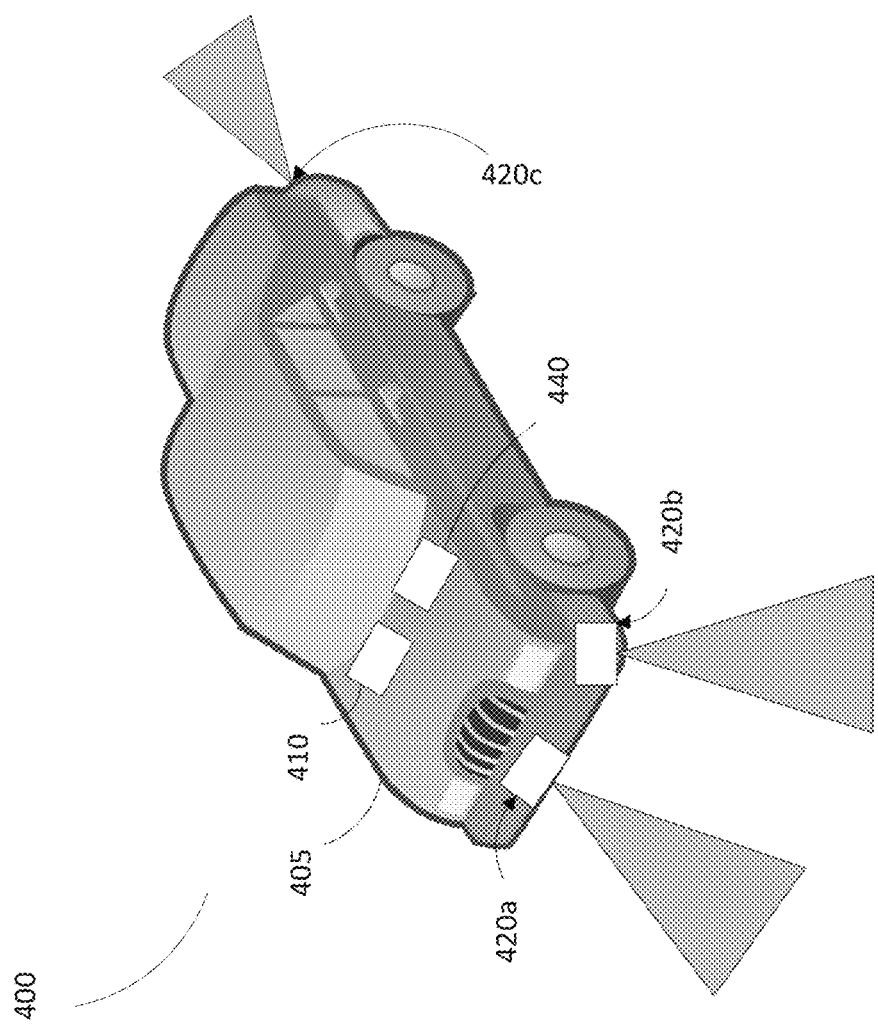
FIG. 4 shows an exemplary vehicle control system.
Figure 4:
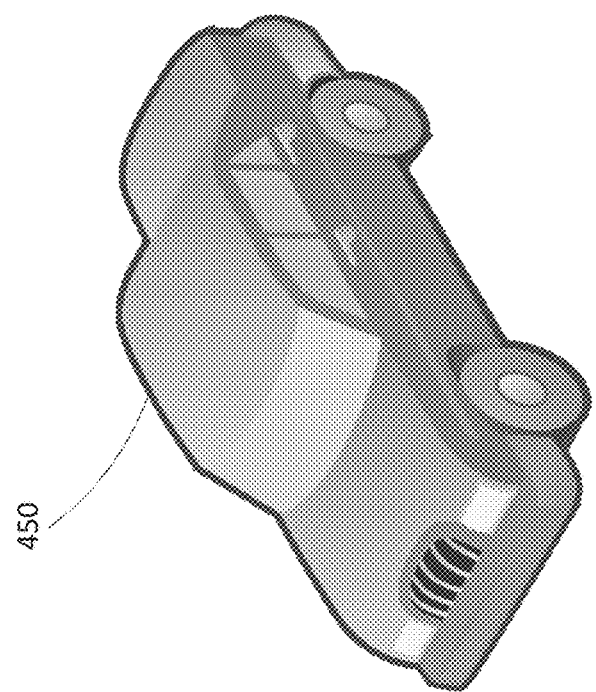

Referring now to FIG. 4, an exemplary embodiment of a driving control system 400 is shown. The system 400 includes a plurality of sensors that are coupled to an ego vehicle 405. The sensors can sense information associated with the ego vehicle 405, and/or an object such as a second vehicle 450. The object can be other objects located longitudinally ahead of or behind the ego vehicle 405 such as a downed tree or one or more traffic cones blocking a lane. The system 400 can be included as at least a portion of a semi-autonomous driving system, an autonomous driving system, and/or a vehicle safety system.

The plurality of sensors can include a first sensor 410 that can be a speedometer, a global positioning system (GPS) sensor, or other applicable sensor configured to sense a speed and/or velocity of the ego vehicle 405.

The first sensor 410 can be coupled to a controller 440 having a memory and a processor and coupled to the ego vehicle 405. The controller 440 can have a bounded-error estimator algorithm stored in the memory, which will be explained in below. The controller 440 can be coupled to a vehicle control system (not shown) of the ego vehicle 405. In some embodiments, the controller 440 can be coupled to the vehicle control system via a Controller Area Network (CAN) bus. The vehicle control system can be an autonomous or semi-autonomous vehicle control system with any number of controllers, interfaces, actuators, and/or sensors capable of controlling a motor, engine, transmission, braking system, steering system, or other subsystem of the ego vehicle. The vehicle control system can be used to perform a vehicle maneuver such as a lane changing maneuver, changing the speed the ego vehicle 405 by controlling the braking and/or throttle of the ego vehicle 405 (i.e. during an adaptive cruise control maneuver), controlling the steering of the front and/or rear wheels of the ego vehicle 405, or controlling the movement (i.e. speed, acceleration, direction of travel, etc.) of the ego vehicle 405 via one or more subsystems of the ego vehicle 405. The vehicle control system may be capable of controlling the steering of the front and/or rear wheels based on steering rates, which may be formulated in radians per second. The vehicle control system can include a steering control subsystem capable of moving the front and/or rear wheels at a given steering rate. In some embodiments, the controller 440 can be coupled to a wireless network such as a cellular network or satellite network in order to establish an internet connection and/or receive traffic information. In some embodiments, the vehicle control system can be an adaptive cruise control system.

The vehicle control system can control components such as the motor, engine, transmission, braking system, steering system, or other subsystem, based on information received from sensors coupled to driver inputs devices such as a brake pedal, accelerator pedal, steering wheel, gear shifter, etc. in order to execute the vehicle maneuver. For example, the vehicle control system can control the motor or engine based on information received from a sensor coupled to the accelerator pedal. The vehicle control system can also control the above components based on commands and/or estimated vehicle states received from a bounded-error estimator system, which will be described below. In some embodiments, the controller 440 may be a portion of the vehicle control system.

Any number of first sensors 410, and second sensors 420, can be coupled to the ego vehicle 405 in order to improve the speed, velocity, and/or object location sensing capabilities of the ego vehicle 405. For example, multiple second sensors 420a and 420b can be mounted to the front of the ego vehicle 405. At least one second sensor can be mounted to the rear of the ego vehicle 405, as indicated by second sensor 420c. Second sensor 420c can be used to sense the location of the second vehicle 450 if the ego vehicle 405 is ahead of the second vehicle 450. The second sensors 420 may include different sensor types, i.e., some of the second sensors 420 are cameras while others are LiDAR sensors. At least one of the seconds 420 can be a LiDAR sensor configured to measure the headway of the second vehicle 450 or a static object such as a parked vehicle, a camera configured to sense a center line of a lane, or other position of an exterior element. The plurality of sensors can be divided up as a number of sub-pluralities of sensors, i.e., a first plurality of sensors, a second plurality of sensors, and a third plurality of sensors. Some of the sub-pluralities of sensors may share sensors or have a common sensor, i.e., a sensor may belong to the first plurality of sensors and the second plurality of sensors. In some embodiments, both the first plurality of sensors and the second plurality of sensors can include a speedometer. It is contemplated that a single sensor capable of sensing all of the parameters described above could be used in place of the first sensor 410 and the second sensor 420. Additionally, multiple controllers 440 may be used in order to implement the driving control system 400. The driving control system 400 can implement safety control systems including but not limited to adaptive cruise control, lane departure systems, blind spot monitoring systems, collision avoidance systems, or other systems that utilize the dynamics of the ego vehicle 400 or second vehicle 450.

As mentioned above, the controller 440 can have a bounded-error estimator algorithm stored in the memory, which can be executed to determine an estimated vehicle state to the vehicle control system. The vehicle state can include information about dynamics of the ego vehicle 405 and/or the second vehicle 450. The algorithm, which may also be referred to as a method, can receive information about a plurality of vehicle states of a vehicle from at least one sensor, each vehicle state being associated with a time point included in a fixed time horizon. The time horizon can include six time points. The method may then determine that the information is missing data about at least one vehicle state included in the plurality of vehicle states. The method may determine a language, which can be a worst-case language, by applying a bitwise logic AND operation to one or more data patterns. As described above, only the missing data pattern where the observations are always available needs to be considered. In some embodiments, the method may utilize a predetermined language calculated using the bitwise logic AND operation. The method may then determine an estimated vehicle state associated with a final vehicle state at the end of horizon included in the plurality of vehicle states. The determining the estimated vehicle state can include calculating a plurality of augmented states for each of the vehicle states included in the plurality of vehicle states and calculating the estimated vehicle state based on the plurality of augmented states. The method may calculate the plurality of augmented states and the estimated vehicle state using a finite horizon estimator (i.e. estimator (2)) optimized using a nonlinear programming solver or a linear programming solver. The finite horizon estimator can be optimized to provide a bounded error estimate for the language, which can be a worst-case language.

Figure 5:
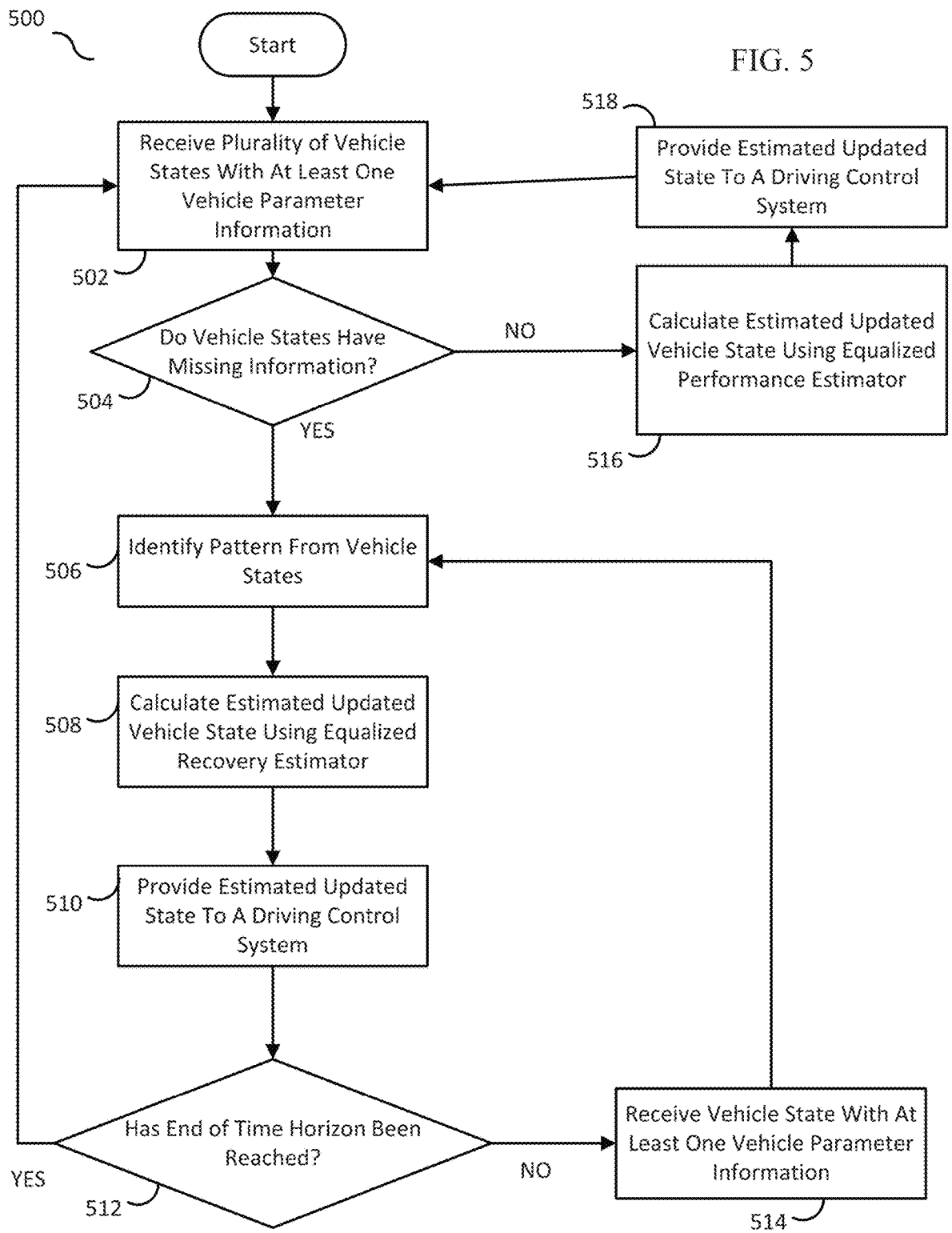
FIG. 5 shows an example of a process for providing dynamics updates to a driving control system.

Referring to FIG. 4 as well as FIG. 5, an example of a process 500 for providing dynamics updates to a driving control system such as semi-autonomous driving system, autonomous driving system, and/or vehicle safety system, such as the adaptive cruise control system detailed in the example above, is show. The method 500 can be implemented as computer readable instructions on a memory in a controller, such as the controller 440 in FIG. 4.

At 502, the process 500 can receive a plurality of vehicle states from at least one sensor coupled to a vehicle. The at least one sensor can include any number or combination of sensors such as one or more first sensors 410 and/or one or more second sensors 420. Each vehicle state can include at least one vehicle parameter information. Parameter information can be directly derived from a sensor, i.e. a speedometer providing a speed of the vehicle, or calculated, i.e. a speed of another vehicle calculated using a LiDAR sensor. The vehicle state is received regardless of if any parameter information is received from the sensors. The parameter information can have a null value if not received, as will be explained below. The parameter information can be the $x_k$ component of equation (1). Each vehicle state can have a time value such as a discrete time value. The time value can be determined by the process 500, one or more of the sensors 410, 420, or by a separate clock. Each vehicle state can also have a discrete state to record if information is missing, which will be explained below. The process 500 can then proceed to 504.

At 504, the process 500 can determine if any of the plurality of vehicle states in the driving history has at least one missing parameter information. Parameter information may be determined to be missing due to a packet drop, as described above, or other communications failure that causes the parameter information to not be received from the sensor by the process, i.e. the parameter information has a null value. In other instances, the parameter information may be determined to be missing if the parameter information indicates the sensor has been occluded, such as if a leaf has blocked a LiDAR sensor, and the parameter information is outside of a predetermined tolerance range or significantly different from a previous value. The vehicle state has a discrete state to record whether or not the vehicle state has missing parameter information. The discrete state can be assigned a "0" value if the parameter information is determined to be missing, and can be assigned a "1" value otherwise. The time value of the most recent vehicle state will be used as an initial time in step 506, as will be explained below. If the vehicle states do not have at least one missing parameter information, the process 500 can proceed to 516. If any of the vehicle states has at least one missing parameter information, the process 500 can proceed to 506.

At 506, the process 500 can identify a pattern from the vehicle states. As described above, each vehicle state has a discrete state that can be a "0" value if the parameter information is determined to be missing, and a "1" value otherwise. The process 500 can then proceed to 508.

At 508, the process 500 can calculate an estimated an updated vehicle state using an equalized recovery estimator. The estimated updated vehicle state can be the $\hat{x}(k+1)$ component of equation (2). The equalized recovery estimator can be previously optimized to provide a bounded error estimate for a pattern in a language $\mathcal{L}$. The language $\mathcal{L}$ can include a single pattern, such as a "worst case" pattern. As described above, using a language with a single worst case pattern (e.g., a worst case language) can cover multiple missing data patterns. For example, the language $\mathcal{L}$ can cover two missing data patterns. The missing data patterns can include the pattern identified at 506. The language $\mathcal{L}$ can be generated by performing a bitwise AND operation on all data patterns associated with the language. The equalized recovery estimator can be optimized previously, i.e. before usage in process 500, using equation (12) above. The equalized recovery estimator is bounded as to achieve equalized recovery as laid out in Definition 1 above. The process 500 can then proceed to 510.

At 510, the process 500 can provide the estimated updated vehicle state to the driving control system. The driving control system may be implemented within a memory and processor or controller that implements the process 500, or another memory and processor or controller such as an electronic control unit configured to implement the driving control system in the vehicle. The driving control system can then determine whether or not to perform a vehicle maneuver based on the estimated updated vehicle state. The process 500 can then proceed to 512. It is also contemplated that the process could end after 510 has been executed.

At 512, the process 500 can determine if end of the time horizon has been reached. If the end of the time horizon has not been reached, the process 500 can proceed to 514. If the recovery time T has reached recovery time, the process 500 can proceed to 502.

At 514, the process 500 can receive a vehicle state from the at least one sensor coupled to the vehicle. 516 may be substantially the same as 502. The process 500 can then proceed to 506.

At 516, the process 500 can calculate an estimated updated vehicle state using the most recent vehicle state. In some embodiments, the estimated updated vehicle state can be calculated using an equalized performance estimator. The equalized performance estimator can include equation (2) above weighted by solving equations (4) and (5) as described above. In some embodiments, the equalized performance estimator has a language with a single word with no missing parameter information. In other words, the word has a "1" for all discrete states. The equalized performance estimator can guarantee a recovery level even for certain derived parameters that may rely on missing data of previous points. For example, acceleration can be derived from measured distances of a sensor in multiple vehicle states, some of which may have missing information. Regardless of if one of the previous vehicle states has missing information, the acceleration derived can be guaranteed to be at or below the recovery level in the current estimated updated vehicle state. The process 500 can then proceed to 518.

At 518, the process 500 can provide the estimated updated vehicle state to the driving control system. 518 may be substantially the same as 510. The process 500 can then proceed to 502.

Thus, the invention provides an improved method of bounded-error estimation of vehicle states.

Although the invention has been described in considerable detail with reference to certain embodiments, one skilled in the art will appreciate that the present invention can be practiced by other than the described embodiments, which have been presented for purposes of illustration and not of limitation. Therefore, the scope of the appended claims should not be limited to the description of the embodiments contained herein.

REFERENCES

[1] R. E. Kalman and R. S. Bucy. New results in linear filtering and prediction theory. Journal of Basic Engineering, 83(3):95-108, 1961.

[2] D. G. Luenberger. Observers for multivariable systems. IEEE Transactions on Automatic Control, 11(2):190-197, 1966.

[3] J. S. Shamma and K. Tu. Set-valued observers and optimal disturbance rejection. IEEE Transactions on Automatic Control, 44(2):253-264, 1999.

[4] M. Milanese and A. Vicino. Optimal estimation theory for dynamic systems with set membership uncertainty: An overview. Automatica, 27(6):997-1009, 1991.

[5] B. Sinopoli, L. Schenato, M. Franceschetti, K. Poolla, M. I. Jordan, and S. S. Sastry. Kalman filtering with intermittent observations. IEEE Transactions on Automatic Control, 49(9):1453-1464, 2004.

[6] S. Smith and P. Seiler. Estimation with lossy measurements: Jump estimators for jump systems. IEEE Transactions on Automatic Control, 48(12):1453-1464, 2003.

[7] K. J. Rutledge, S. Z. Yong, and N. Ozay. Optimization-based design of bounded-error estimators robust to missing data. In IFAC Conference on Analysis and Design of Hybrid Systems, pages 157-162, 2018.

[8] F. Blanchini and M. Sznaier. A convex optimization approach to synthesizing bounded complexity $l^\infty$ filters. IEEE Transactions on Automatic Control, 57(1):216-221, 2012.

[9] O. Mickelin, N. Ozay, and R. M. Murray. Synthesis of correct-by construction control protocols for hybrid systems using partial state information. In American Control Conference, pages 2305-2311, 2014.

[10] J. Skaf and S. P. Boyd. Design of affine controllers via convex optimization. IEEE Transactions on Automatic Control, 55(11):2476-2487, 2010.

[11] P. J. Goulart and E. C. Kerrigan. Output feedback receding horizon control of constrained systems. International Journal of Control, 80(1):8-20, 2007.

[12] D. Bertsimas, D. B. Brown, and C. Caramanis. Theory and applications of robust optimization. SIAM Review, 53(3):464-501, 2011.

[13] A. Ben-Tal, L. El Ghaoui, and A. Nemirovski. Robust optimization. Princeton University Press, 2009.

[14] J. Lofberg. Yalmip: A toolbox for modeling and optimization in Matlab. In Proceedings of the CACSD Conference, Taiwan, 2004.

[15] A. Wachter and L. T. Biegler. On the implementation of a primal dual interior point filter line search algorithm for large-scale nonlinear programming. Mathematical Programming, 106(1):25-57, 2006.

[16] Gurobi Optimization Inc. Gurobi optimizer reference manual, 2015. URL: http://www.gurobi.com.

The citation of any document is not to be construed as an admission that it is prior art with respect to the present invention.

What is claimed is:

1. A method for use in a data processing system comprising at least one processor and at least one memory, the at least one memory storing instructions that when executed by the at least one processor cause the at least one processor to implement a bounded-error estimator system, the method comprising:
    receiving information about a plurality of vehicle states of a vehicle from at least one sensor, each vehicle state being associated with a time point included in a time horizon;
    determining that the information is missing data about at least one vehicle state included in the plurality of vehicle states in a first predetermined pattern, the first predetermined pattern comprising an indication of missing data at a first discrete time point;
    determining an estimated vehicle state associated with a final vehicle state included in the plurality of vehicle states, the determining the estimated vehicle state comprising:
    calculating a plurality of augmented states for each of the vehicle states included in the plurality of vehicle states using an estimator associated with a language comprising a second predetermined pattern, the second predetermined pattern comprising an indication of missing data at the first discrete time point and a second discrete time point; and
    calculating the estimated vehicle state based on the plurality of augmented states; and
    providing the estimated vehicle state to a vehicle control system of the vehicle.

2. The method of claim 1 further comprising:
    receiving information about a second plurality of vehicle states of the vehicle from the at least one sensor, each vehicle state being associated with a time point included in a second time horizon;
    determining that the information about the second plurality of vehicle states is missing data about at least one vehicle state included in the second plurality of vehicle states in a third predetermined pattern, the third predetermined pattern comprising an indication of missing data at the second discrete time point;
    determining a second estimated vehicle state associated with a second final vehicle state included in the plurality of vehicle states, the determining the second estimated vehicle state comprising:
    calculating a second plurality of augmented states for each of the vehicle states included in the second plurality of vehicle states using the estimator; and
    calculating the second estimated vehicle state based on the second plurality of augmented states; and
    providing the second estimated vehicle state to the vehicle control system.

3. The method of claim 1, wherein the at least one sensor includes at least one of a speedometer, a LIDAR sensor, or a camera.

4. The method of claim 1, wherein the estimator is a finite horizon estimator optimized using a linear programming solver.

5. The method of claim 1, wherein the estimator is a finite horizon estimator optimized using a nonlinear programming solver.

6. The method of claim 5 further comprising:
determining the language using a bitwise logic AND operation.

7. The method of claim 6, wherein the finite horizon estimator is optimized to provide a bounded error estimate for the language.

8. The method of claim 1, wherein the time horizon comprises at least six time points.

9. The method of claim 1, wherein the vehicle control system is an adaptive cruise control system.

10. The method of claim 1, wherein the providing the estimated vehicle state to the vehicle control system of the vehicle comprises:
causing the vehicle control system to execute a vehicle maneuver based on the estimated vehicle state.

11. A driving control system for a vehicle having at least one sensor, the driving control system comprising:
at least one sensor coupled to a vehicle; and
a controller in electrical communication with the at least one sensor, the controller being configured to execute a bounded-error estimator system program stored in the controller to:
(i) receive information about a plurality of vehicle states of a vehicle from the at least one sensor, each vehicle state being associated with a time point included in a time horizon;
(ii) determine that the information is missing data about at least one vehicle state included in the plurality of vehicle states in a first predetermined pattern, the first predetermined pattern comprising an indication of missing data at a first discrete time point;
(iii) determine an estimated vehicle state associated with a final vehicle state included in the plurality of vehicle states, the determining the estimated vehicle state comprising:
(iv) calculating a plurality of augmented states for each of the vehicle states included in the plurality of vehicle states using an estimator associated with a language comprising a second predetermined pattern, the second predetermined pattern comprising an indication of missing data at the first discrete time point and a second discrete time point; and
(v) calculating the estimated vehicle state based on the plurality of augmented states; and
(vi) providing the estimated vehicle state to a vehicle control system of the vehicle.

12. The system of claim 11, wherein the controller is further configured to execute the bounded-error estimator system program to:
(vii) receive information about a second plurality of vehicle states of the vehicle from the at least one sensor, each vehicle state being associated with a time point included in a second time horizon;
(viii) determine that the information about the second plurality of vehicle states is missing data about at least one vehicle state included in the second plurality of vehicle states in a third predetermined pattern, the third predetermined pattern comprising an indication of missing data at the second discrete time point;
(ix) determine a second estimated vehicle state associated with a second final vehicle state included in the plurality of vehicle states, the determining the second estimated vehicle state comprising:
calculating a second plurality of augmented states for each of the vehicle states included in the second plurality of vehicle states using the estimator; calculating
the second estimated vehicle state based on the second plurality of augmented states; and
(xii) providing the second estimated vehicle state to the vehicle control system.

13. The system of claim 11, wherein the at least one sensor includes at least one of a speedometer, a LIDAR sensor, or a camera.

14. The system of claim 11, wherein the estimator is a finite horizon estimator optimized using a linear programming solver.

15. The system of claim 11, wherein the estimator is a finite horizon estimator optimized using a nonlinear programming solver.

16. The system of claim 15 further comprising:
determining the language using a bitwise logic AND operation.

17. The system of claim 16, wherein the finite horizon estimator is optimized to provide a bounded error estimate for the language.

18. The system of claim 11, wherein the time horizon comprises at least six time points.

19. The system of claim 11, wherein the vehicle control system is an adaptive cruise control system.

20. The system of claim 11, wherein the providing the estimated vehicle state to the vehicle control system of the vehicle comprises:
causing the vehicle control system to execute a vehicle maneuver based on the estimated vehicle state.

21. A method for use in a data processing system comprising at least one processor and at least one memory, the at least one memory storing instructions that, when executed by the at least one processor, cause the at least one processor to implement a bounded-error estimator system, the method comprising:
receiving information about a plurality of vehicle states of a vehicle from at least one sensor, each vehicle state being associated with a time point included in a time horizon;
determining that the information is missing data about at least one vehicle state included in the plurality of vehicle states in a first predetermined pattern, the first predetermined pattern comprising an indication of missing data at a first discrete time point;
determining an estimated vehicle state associated with a final vehicle state included in the plurality of vehicle states, the determining the estimated vehicle state comprising:
calculating a plurality of augmented states for each of the vehicle states included in the plurality of vehicle states using an estimator associated with a language comprising a second predetermined pattern, the second predetermined pattern comprising an indication of missing data at the first discrete time point and a second discrete time point; and
calculating the estimated vehicle state based on the plurality of augmented states; and
causing a vehicle control system of the vehicle to perform a vehicle maneuver based on the estimated vehicle state.

* * * * *